United States Patent [19]

Posso

[11] Patent Number: 4,940,140

[45] Date of Patent: Jul. 10, 1990

[54] CASE FOR CONTAINING AND IMMOBILIZING A COMPUTER TAPE REEL

[75] Inventor: Patrick Posso, Pully, Switzerland

[73] Assignee: Gefitec S.A., Switzerland

[21] Appl. No.: 418,082

[22] Filed: Oct. 6, 1989

[30] Foreign Application Priority Data

Oct. 10, 1988 [FR] France ................... 88 13285

[51] Int. Cl.$^5$ .............. G11B 23/27; B65D 45/00; B65D 85/57

[52] U.S. Cl. .................. 206/405; 206/493; 220/324; 220/323

[58] Field of Search ............. 206/403, 404, 405, 406, 206/54, 493, 303; 292/DIG. 4; 220/323, 324, 326

[56] References Cited

U.S. PATENT DOCUMENTS

| | | | |
|---|---|---|---|
| 3,307,689 | 3/1967 | Lyman | 206/405 |
| 3,369,654 | 2/1968 | Burgess | 206/406 |
| 3,540,578 | 11/1970 | Jones et al. | 220/324 X |
| 3,661,250 | 9/1972 | Lyman | 206/405 |
| 3,862,555 | 1/1975 | Wirth | 206/405 X |
| 4,320,834 | 3/1982 | Tamaki | 206/404 |
| 4,746,013 | 5/1988 | Suzuki et al. | 220/326 X |

FOREIGN PATENT DOCUMENTS 2050800 2/1971 France .

Primary Examiner—Paul T. Sewell
Assistant Examiner—Jacob K. Ackun, Jr.
Attorney, Agent, or Firm—Brumbaugh, Graves, Donohue & Raymond

[57] ABSTRACT

This invention relates to a case for containing and immobilizing a computer tape reel, wherein the cover is locked on the body of the case by a single spring catch mounted to slide in a housing in the cover and provided with a locking means cooperating with a means of the body mating therewith under the action of an elastic member, said spring catch being rendered captive by a flexible stop with inclined ramp capable of contacting a lug of the cover likewise with inclined ramp.

1 Claim, 2 Drawing Sheets

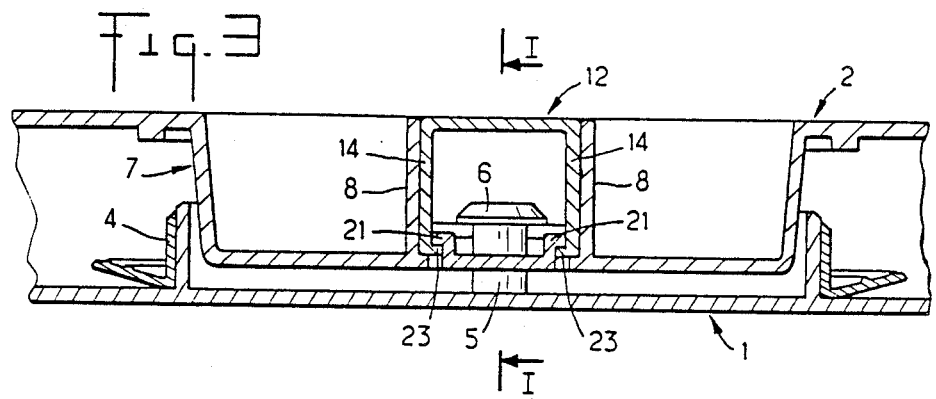
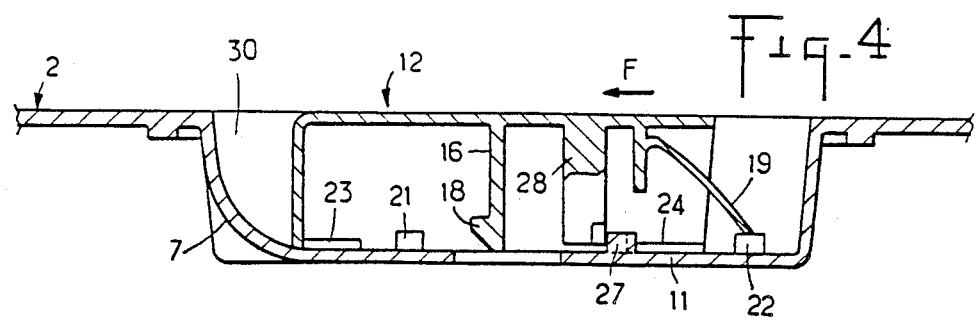

CASE FOR CONTAINING AND IMMOBILIZING A
COMPUTER TAPE REEL

FIELD OF THE INVENTION

The present invention relates to a case adapted to contain and immobilize a computer tape reel.

BACKGROUND OF THE INVENTION

Such a case is known in particular by French Pat. No. 2,455,554. It comprises a body in which are integrally moulded a central post and a sleeve concentric thereto. The case also comprises a cover closing the body, imprisoning the tape reel of which the hub is centred on a single immobilizing ring surrounding the sleeve. The cover presents a central dish fitting in the sleeve of the body and on said post and defining a housing adapted to receive a locking device cooperating with this post.

In that Patent, the locking device is constituted by a single spring catch covering the post and guided in translation between the bottom of the central dish in the cover and a cap, which is fitted and fixed after assembly of the spring catch in said dish. This spring catch and the post of the body comprise mating engagement means capable of being meshed by a leaf spring integral with said spring catch and abutting on the lateral wall of the dish in order to provoke slide for engagement.

This known case presents the drawback of comprising four distinct pieces: the body, the cover, the spring catch and the cap, and consequently of requiring four operations of manufacture with four different moulds.

Furthermore, it is difficult to assemble on an automatic machine.

Locking thereof is not absolutely sure since it depends on the fixation of the cap.

Its cost is relatively high.

It is therefore an object of the present invention to simplify the design and construction of the locking device, as well as the assembly of the components, to reduce the number thereof from four to three, manufacturing them solely in plastics material, to eliminate the subsidiary assembly means by adopting an irreversible fit system and to render assembly easy, rapid and by means of an automatic machine. Consequently, the case may be mass-produced at a low cost price and with a reduced investment in tools.

SUMMARY OF THE INVENTION

To that end and according to the invention, means for guiding the spring catch are opened in order to be able to engage in those of the dish during a slide for disengagement and said spring catch is integral with a flexible stop deformable in a plane perpendicular to the direction of slide and cooperating with a lug of the dish limiting the stroke of engagement, said stop and lug presenting inclined ramps provoking retraction of said stop during assembly of the spring catch in the housing of the cover distinct from the body, by slide in the direction of disengagement, the stop being placed, after the lug has been cleared, opposite the latter to determine the position of engagement and to render the spring catch captive of the cover.

BRIEF DESCRIPTION OF THE DRAWINGS

The invention will be more readily understood on reading the following description with reference to the accompanying drawings, in which:

FIG. 3 is an elevational part section taken along line III—III of FIG. 1.

FIG. 4 is a view similar to FIG. 1, illustrating the assembly of the spring catch in the cover.

DETAILED DESCRIPTION OF THE DRAWINGS

Figure 1:
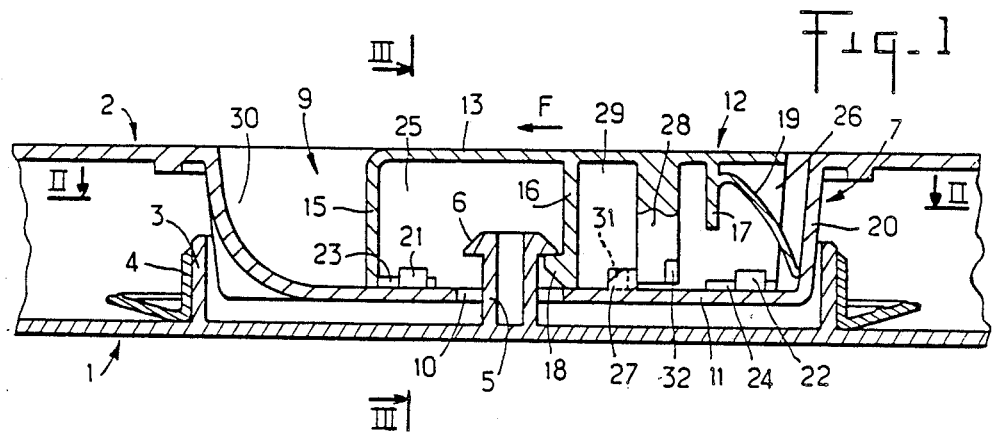
FIG. 1 is a partial diametral section through a case incorporating a locking device according to the invention, this section being taken along line I—I of FIG. 3 which corresponds to the axis of slide of the spring catch.
Figure 2:
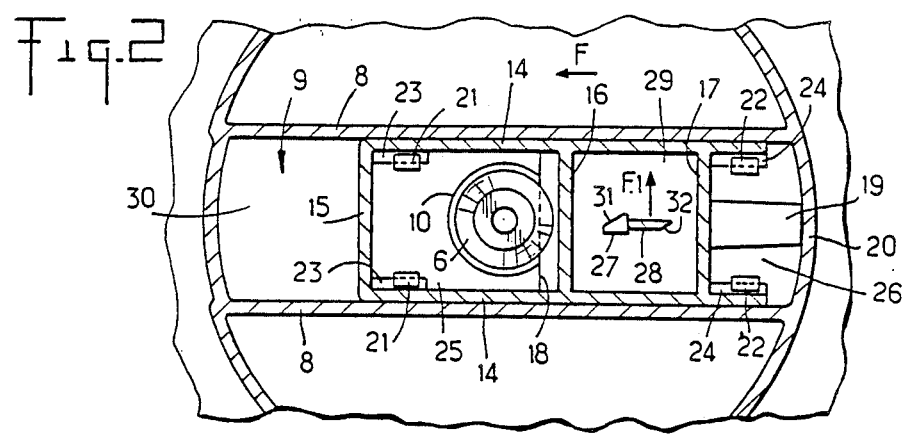
FIG. 2 is a partial section taken in plane along line II—II of FIG. 1.

Referring now to the drawings, FIGS. 1 to 3 show the case which comprises a body 1 and a cover 2 adapted to contain a computer tape reel (not shown) and to immobilize it when they are locked on each other.

The body 1 presents, inwardly projecting therein, a tubular sleeve 3 surrounded by a single ring 4 provided for immobilizing the hub of the reel. The body presents, likewise projecting inwardly thereof, at the centre of the sleeve 3, a post 5 comprising a protuberant end flange 6 intended for locking the cover 2 on this body 1.

The cover 2 presents, recessed therein, a dish 7 fitting in the sleeve 3 of the body 1, but without coming into contact therewith when the case is closed. The dish 7 comprises two parallel partitions 8 which define a housing 9 open to the outside and into which opens out a central hole 10 made in the bottom 11 of the dish for the passage of the post 5.

In this housing 9 is mounted a spring catch 12 which, like the body 1 and the cover 2, is constituted by a moulded plastics material. The spring catch 12 presents an upper wall 13 integral with two longitudinal walls 14 and transverse elements 15 to 17. The longitudinal walls are disposed against the partitions 8 of the cover. Element 15 is a front wall descending down to bottom 11. Element 16 is an intermediate bar which also descends down to bottom 11 and comprises a projecting tooth 18 capable of engaging beneath the flange 6 of the post 5 in order to lock the cover 2 on the body 1. Element 17 is a rib integral with a leaf spring 19 intended, by abutting on the wall 20 of the dish, to push the spring catch in the direction of engagement defined by arrow F.

Moreover, bottom 11 of dish 7 presents, projecting therein, two front slide elements 21 and two rear slide elements 22 in which are guided flanges 23 and 24 respectively of the spring catch 12. The flanges 23 extend along the longitudinal walls 14 from the front wall 15 and are located, like slide elements 21, in a recess 25 defined above the bottom 11, by the spring catch 12 between its wall 15 and its bar 16. Flanges 24 extend along the longitudinal walls 14 from the rear wall 17 and are located, like slide elements 22, in a recess 26 defined above the bottom 11 by the spring catch 12 between its wall 17 and wall 20 of the dish. Recess 26 is completely covered by the upper wall 13 of the spring catch when said spring catch is disengaged (tooth 18 not being in mesh with flange 6) and when the case is open; recess 26 is only partially covered by upper wall 13 when the spring catch is engaged as shown in FIG. 1 (tooth 18 being in mesh with flange 6) and when the case is closed and locked. In any case, the means for guiding the spring catch are virtually inaccessible in these two positions of engagement and of disengagement.

Furthermore, the bottom 11 of the dish and the upper wall 13 of the spring catch 12 present a mating lug 27 and flexible stop 28 projecting towards each other in a recess 29 defined in said spring catch by the bar 16 and the rib 17. Stop 28 is maintained in contact with lug 27 (FIGS. 1 and 2) by the leaf spring 19 to determine the position of engagement of the tooth 18 with the flange 6, position in which the case is closed and locked.

When the user wishes to open the case, he/she inserts a finger in a recess 30 made in the dish 7 in front of the spring catch 12 and pushes the latter, against the action of the leaf spring 19, until it abuts against the wall 20 of the dish. The end of this stroke in the direction opposite that of arrow F corresponds to the position of disengagement in which the tooth 18 is not in mesh with the flange 6 and releases the cover, thus enabling the case to be opened.

Assembly of the spring catch 12 requires placing the stop 28 behind the lug 27 (FIGS. 1 and 2). FIG. 4 shows how this operation may be carried out automatically.

Lug 27 and stop 8 present mating inclined ramps 31 and 32 respectively. The cover 2 not being mounted on the body 1, the hole 10 is free from post 5. Consequently, the spring catch 12 is deposited in housing 9 so that its flanges 23, 24 rest on the bottom 11 in front of slide elements 21, 22 and stop 28 is disposed in front of lug 27 (position shown in FIG. 4). Spring catch 12 is then moved in translation in the direction opposite that of arrow F, which has for its effect successively to bend the stop 28 in the direction of arrow F1 by cooperation of the mating inclined ramps 31 and 32, then to engage the flanges 23, 24 in the slide elements 21, 22, finally to release the stop 28 which, by elastic return, is placed behind the lug 27; of course, at the end of this slide, the leaf spring 19 is under strain on bending and in that case exerts an elastic return force on the spring catch to place it in position of engagement by contact of stop 28 with lug 27, position in which the tooth 18 of the bar 16 is placed beneath the flange 6 of post 5 and locks the case in position of closure.

The spring catch 12, once mounted, has definitively become captive of cover 2.

What is claimed is:

1. A case for containing a computer tape reel comprising:

a lower body having an integrally molded central post and a concentric sleeve;

a cover closing the lower body and enclosing said computer tape reel, wherein said computer tape reel is centered on a single immobilizing ring surrounding said concentric sleeve; said cover having a central dish, adapted to fit in said sleeve of said body and formed with an opening surrounding said post, said central dish having a guidable housing adapted to engage said post, said guidable housing comprising:

an intermediate bar, extending perpendicularly from said guidable housing and engaging said post;

a spring means having an integral leaf spring contacting said housing and providing slidable spring engagement of said intermediate bar with said post, said case having means for guiding said intermediate bar from an open position to a closed position in order to slidably disengage or engage said post; said spring means further comprising a flexible stop which is deformable in a plane perpendicular to the direction in which the housing is moved, said stop adapted to cooperate with a lug formed on said dish, said stop and lug having inclined raps to facilitate assembly and prevent retraction of said stop during assembly of said cover thereby rendering said intermediate bar captive of said cover.

* * * * *